United States Patent
Yan et al.

(10) Patent No.: US 11,396,827 B2
(45) Date of Patent: Jul. 26, 2022

(54) CONTROL METHOD FOR OPTIMIZING SOLAR-TO-POWER EFFICIENCY OF SOLAR-AIDED COAL-FIRED POWER SYSTEM UNDER OFF-DESIGN WORKING CONDITIONS

(71) Applicant: XI'AN JIAOTONG UNIVERSITY, Shaanxi (CN)

(72) Inventors: Hui Yan, Shaanxi (CN); Ming Liu, Shaanxi (CN); Xin Li, Shaanxi (CN); Daotong Chong, Shaanxi (CN); Junjie Yan, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/606,042

(22) PCT Filed: Jan. 25, 2021

(86) PCT No.: PCT/CN2021/073591
§ 371 (c)(1),
(2) Date: Oct. 24, 2021

(87) PCT Pub. No.: WO2021/164496
PCT Pub. Date: Aug. 26, 2021

(65) Prior Publication Data
US 2022/0145779 A1    May 12, 2022

(30) Foreign Application Priority Data
Feb. 19, 2020    (CN) .......................... 202010102196.0

(51) Int. Cl.
*F01K 7/16*    (2006.01)
*G05B 17/02*    (2006.01)
(Continued)

(52) U.S. Cl.
CPC .............. *F01K 7/165* (2013.01); *F01K 11/02* (2013.01); *F24S 50/00* (2018.05); *G05B 17/02* (2013.01)

(58) Field of Classification Search
CPC .......... F01K 7/165; F01K 11/02; F24S 50/00; G05B 17/02
(Continued)

(56) References Cited

U.S. PATENT DOCUMENTS

| | | | |
|---|---|---|---|
| 10,794,228 B2 * | 10/2020 | Huntington | ............... F22B 1/16 |
| 2008/0092551 A1 | 4/2008 | Skowronski | |

(Continued)

FOREIGN PATENT DOCUMENTS

| | | |
|---|---|---|
| CN | 108053073 A | 5/2018 |
| CN | 111306820 A | 6/2020 |

OTHER PUBLICATIONS

Jianxing Wang, Design optimization of solar-aided coal-fired power generation system under whole work conditions, China Doctoral Dissertations Full-text Database Science-Engineering (B), Jan. 15, 2020 (Jan. 15, 2020), vol. 1, ISSN: 1674-022X, pp. 79-107.

*Primary Examiner* — Hoang M Nguyen

(57) ABSTRACT

A control method for optimizing a solar-to-power efficiency of a solar-aided coal-fired power system under off-design working conditions is provided. Through reading the relevant information of the solar collecting system, the coal-fired power generation system, the environmental conditions, and the working conditions of the solar-aided coal-fired power system, the water flow rate range able to be heated by the solar collecting unit and the solar-coal feedwater flow distribution ratio range are determined; through establishing the relationship between the solar-to-power efficiency and the solar-coal feedwater flow distribution ratio, the solar-coal feedwater flow distribution ratio is regulated, so that a flow rate of water entering the solar (Continued)

collecting system to be heated is controlled, thereby maximizing the solar-to-power efficiency and improving the economy of the solar-aided coal-fired power system. The present invention provides clear guidance to improve the utilization rate of solar energy and facilitate the consumption of the renewable energy.

4 Claims, 3 Drawing Sheets

(51) Int. Cl.
*F24S 50/00* (2018.01)
*F01K 11/02* (2006.01)

(58) Field of Classification Search
USPC .......................................... 60/641.8–641.15
See application file for complete search history.

(56) References Cited

U.S. PATENT DOCUMENTS

| 2013/0019599 A1* | 1/2013 | Birnbaum | F03G 6/067 |
| | | | 60/641.15 |
| 2015/0167648 A1* | 6/2015 | Bergan | F03G 7/04 |
| | | | 60/641.15 |
| 2021/0310365 A1* | 10/2021 | Yan | F22D 11/06 |

\* cited by examiner

CONTROL METHOD FOR OPTIMIZING SOLAR-TO-POWER EFFICIENCY OF SOLAR-AIDED COAL-FIRED POWER SYSTEM UNDER OFF-DESIGN WORKING CONDITIONS

BACKGROUND OF THE PRESENT INVENTION

Field of Invention

The present invention relates to a field of operational control of a multi-energy complementary power generation system, and more particularly to a control method for optimizing a solar-to-power efficiency of a solar-aided coal-fired power system under off-design working conditions.

Description of Related Arts

In recent years, in order to solve the environmental pollution problem caused by use of the fossil fuel, the renewable energy has developed rapidly. However, because the renewable energy such as solar energy is intermittent energy, its large-scale grid-connection will cause the severe fluctuations of the power grid, and therefore the thermal power unit is required for peak shaving. Thus, the multi-energy complementary power generation system becomes a vigorous development direction in China. Because the solar-aided coal-fired way is a typical way of multi-energy complementation, the solar-aided coal-fired power plant can reduce the influence of the external environment on the solar-aided coal-fired power system, so that the solar-aided coal-fired power system can stably convert solar energy into electricity, thereby achieving the purpose of energy conservation and emission reduction. Meanwhile, the solar-aided coal-fired power plant can omit the devices such as the steam turbine in the traditional concentrated solar power plant, having the advantage of low investment. However, most of the conventional solar-aided coal-fired power systems are difficult to control. Most of the control methods only consider the operation under the design working conditions, without considering how to maintain the efficient utilization of solar energy under the solar irradiance fluctuations and the off-design working conditions of the solar-aided coal-fired power system. Thus, it is difficult to accurately evaluate the effect of solar energy in the solar-aided coal-fired power system, and it is also difficult to ensure the operation of the solar-aided coal-fired power system under the off-design working conditions as well as the smooth consumption of the renewable energy.

SUMMARY OF THE PRESENT INVENTION

In order to solve above problems existing in the prior art, the present invention provides a control method for optimizing a solar-to-power efficiency of a solar-aided coal-fired power system under off-design working conditions. Through establishing a relationship between a solar-coal feedwater flow distribution ratio and the solar-to-power efficiency of the solar-aided coal-fired power system under the off-design working conditions, the solar-coal feedwater flow distribution ratio is regulated and a flow rate of water entering a solar collecting system to be heated is controlled, so that a control objective of optimizing the solar-to-power efficiency is realized, solar energy is fully utilized, and an energy utilization rate and economy of the solar-aided coal-fired power system under the off-design working conditions are improved.

In order to accomplish the above objective, the present invention adopts technical solutions as follows.

A control method for optimizing a solar-to-power efficiency of a solar-aided coal-fired power system under off-design working conditions is provided, wherein: an operational control objective of the solar-aided coal-fired power system under the off-design working conditions is to optimize the solar-to-power efficiency; the solar-to-power efficiency means a conversion ratio of solar radiation energy received by the solar-aided coal-fired power system into electricity, namely a ratio of additional power generation of the solar-aided coal-fired power system to the solar radiation energy received by the solar-aided coal-fired power system when the solar-aided coal-fired power system has the same boiler heat absorption as a conventional coal-fired power generation system uncoupled with solar energy;

the solar-to-power efficiency is calculated through steps of: firstly, through equation (1), calculating a specific enthalpy of mixing water heated by a solar collecting system and high-pressure heaters; then, combined with an off-design working condition calculation method of a thermodynamic system, through equation (2), calculating a generation power $W_{SCPP}$ of the solar-aided coal-fired power system; next, assuming that the solar-aided coal-fired power system and the conventional coal-fired power generation system uncoupled with solar energy have the same boiler heat absorption, and calculating the solar-to-power efficiency $\eta_{SE}$ according to equation (3) and equation (4);

$$h_{w(i-1),in} = \alpha_{TCS} \times h_{s,out} + (1-\alpha_{TCS})h_{wi,out} \qquad (1)$$

in the equation (1), $h_{w(i-1),in}$ is the specific enthalpy of mixing water heated by the solar collecting system and the high-pressure heaters, i=1, 2, • • • , n, in unit of kJ/kg; n is a total number of regenerative heaters of the solar-aided coal-fired power system, wherein the regenerative heaters are numbered 1 to n consecutively from high pressure to low pressure; $\alpha_{TCS}$ is a solar-coal feedwater flow distribution ratio; $h_{s,out}$ is a specific enthalpy of water heated by the solar collecting system, in unit of kJ/kg; and $h_{wi,out}$ is a specific enthalpy of water heated by the high-pressure heaters, in unit of kJ/kg;

$$W_{SCPP} = D_0 h_0 + D_{zr}h_{zr} - \sum_{i=1}^{n} D_i h_{wi,in} - D_c h_c - D_{sg1}h_{sg1} - D_{sg2}h_{sg2} \qquad (2)$$

in the equation (2), $W_{SCPP}$ is the generation power of the solar-aided coal-fired power system, in unit of MW; $D_0$ is a flow rate of main steam of the solar-aided coal-fired power system, in unit of kg/s; $h_0$ is a specific enthalpy of main steam of the solar-aided coal-fired power system, in unit of kJ/kg; $D_{zr}$ is a flow rate of reheated steam of the solar-aided coal-fired power system, in unit of kg/s; $h_{zr}$ is a specific enthalpy of reheated steam of the solar-aided coal-fired power system, in unit of kJ/kg; $D_i$ is a flow rate of $i^{th}$-stage extraction steam of a steam turbine for coal-fired power generation in the solar-aided coal-fired power system, i=1, 2, • • • , n, in unit of kg/s; $h_c$ is a specific enthalpy of $i^{th}$-stage extraction steam of the steam turbine for coal-fired power generation in the solar-aided coal-fired power system, in unit of kJ/kg; $D_c$ is a flow rate of exhaust steam of the solar-aided coal-fired power system, in unit of kg/s; $h_c$ is a specific enthalpy of exhaust steam of the solar-aided coal-fired power system, in unit of kJ/kg; $D_{sg1}$ and $D_{sg2}$ are flow rates of front shaft seal steam and back shaft seal steam of the steam turbine for coal-fired power generation in the solar-aided coal-fired power system, in unit of kg/s; $h_{sg1}$ and $h_{sg2}$ are specific enthalpies of front shaft seal steam and back shaft seal steam of the steam turbine for coal-fired power generation in the solar-aided coal-fired power system, in unit of kJ/kg;

$$W_{add} = W_{SCPP} - W_{eq} \quad (3)$$

in the equation (3), $W_{add}$ is additional power of the solar-aided coal-fired power system under the same boiler heat absorption, in unit of MW; $W_{eq}$ is an equivalent generation power of the conventional coal-fired power generation system uncoupled with solar energy when having the same boiler heat absorption as the solar-aided coal-fired power system under the same power generation load requirement, in unit of MW;

$$\eta_{SE} = \frac{10^6 W_{add}}{DNI \cdot A_c} \quad (4)$$

in the equation (4), $\eta_{SE}$ is the solar-to-power efficiency of the solar-aided coal-fired power system; DNI is a solar direct normal irradiance, in unit of W/m²; $A_c$ is a solar collecting area, in unit of m²;

the control method for optimizing the solar-to-power efficiency of the solar-aided coal-fired power system under the off-design working conditions comprises steps of:

(1) reading relevant information of the solar collecting system in parallel with the high-pressure heaters, a coal-fired power generation system and environmental conditions in the solar-aided coal-fired power system;

(2) reading working conditions of the solar-aided coal-fired power system;

(3) according to a working temperature range of heat transfer oil of a solar collecting unit and a safely working range of devices of the solar collecting unit, determining a water flow rate range able to be heated by the solar collecting unit; then, according to a ratio of the water flow rate range to a feedwater flow rate of the coal-fired power generation system, determining a solar-coal feedwater flow distribution ratio range of the solar-aided coal-fired power system;

(4) in the solar-coal feedwater flow distribution ratio range calculated through the step (3), calculating a solar-to-power efficiency $\eta_{SE}$ of the solar-aided coal-fired power system under current solar irradiance conditions and power load conditions, and establishing a relationship between the solar-to-power efficiency and the solar-coal feedwater flow distribution ratio of the solar-aided coal-fired power system;

(5) selecting an optimized solar-coal feedwater flow distribution ratio, specifically comprising steps of: in the relationship between the solar-to-power efficiency and the solar-coal feedwater flow distribution ratio under required working conditions, which is established through the step (4), selecting a solar-coal feedwater flow distribution ratio corresponding to a maximum value of the solar-to-power efficiency as the optimized solar-coal feedwater flow distribution ratio; and (6) according to the optimized solar-coal feedwater flow distribution ratio obtained through the step (5), regulating a flow rate of water entering the solar collecting system to be heated to an optimized flow rate $D_{wTCS}^*$, wherein $D_{wTCS}^*$ is calculated through:

$$D_{wTCS}^* = \alpha_{TCS}^* \cdot D_w;$$

in the above equation, $D_{wTCS}^*$ is the optimized flow rate of water entering the solar collecting system to be heated, in unit of kg/s; $\alpha_{TCS}^*$ is the optimized solar-coal feedwater flow distribution ratio; and $D_w$ is a feedwater flow rate under current working conditions, in unit of kg/s;

when the working conditions of the solar-aided coal-fired power system change or the solar irradiance changes, the steps (1)-(6) are repeated to achieve the control objective again.

Preferably, in the step (1), the read relevant information of the environmental conditions comprises a current solar irradiance and an environmental temperature; the read relevant information of the solar collecting system comprises relevant information of the solar collecting unit and relevant information of a heliostat field; the read relevant information of the coal-fired power generation system comprises main steam parameters, extraction steam parameters of the steam turbine for coal-fired power generation, and operation information of the high-pressure heaters and low-pressure heaters, which are required for calculation of the generation power.

Preferably, a design solar irradiance is an average solar direct normal irradiance of a typical meteorological year at an operation location of the solar-aided coal-fired power system; in the step (5), the solar-coal feedwater flow distribution ratio corresponding to the maximum value of the solar-to-power efficiency is: under 80%-100% power load, the solar-coal feedwater flow distribution ratio is controlled to operate at a lower limiting value; under 60%-80% power load, when the solar direct normal irradiance is not less than 85%-105% design solar irradiance, the solar-coal feedwater flow distribution ratio is controlled to operate at the lower limiting value, while when the solar direct normal irradiance is less than 85%-105% design solar irradiance, the solar-coal feedwater flow distribution ratio is controlled to operate between 0.2 and 0.3; under 40%-60% power load, when the solar direct normal irradiance is not less than 94%-110% design solar irradiance, the solar-coal feedwater flow distribution ratio is controlled to operate between 0.4 and 0.45, while when the solar direct normal irradiance is less than 94%-110% design solar irradiance, the solar-coal feedwater flow distribution ratio is controlled to operate between 0.25 and 0.3.

Preferably, the solar collecting system of the solar-aided coal-fired power system is connected in parallel with a second-stage high-pressure heater and a third-stage high-pressure heater.

Compared with the prior art, the present invention has advantages as follows.

(1) The present invention considers the operation of the solar-aided coal-fired power system under the off-design working conditions. Through determining the relationship between the solar-to-power efficiency and the solar-coal feedwater flow distribution ratio of the solar-aided coal-fired power system, the flow rate of feedwater entering the solar collecting system to be heated is regulated, so that the objective of optimizing the solar-to-power efficiency is realized, and the energy utilization rate and economy of the solar-aided coal-fired power system under the off-design working conditions are improved.

(2) The present invention is simple to operate and easily implemented, and has low investment and short recovery period.

DETAILED DESCRIPTION OF THE PREFERRED EMBODIMENT

The present invention is further illustrated in detail with the accompanying drawings and the preferred embodiment as follows.

Figure 1:
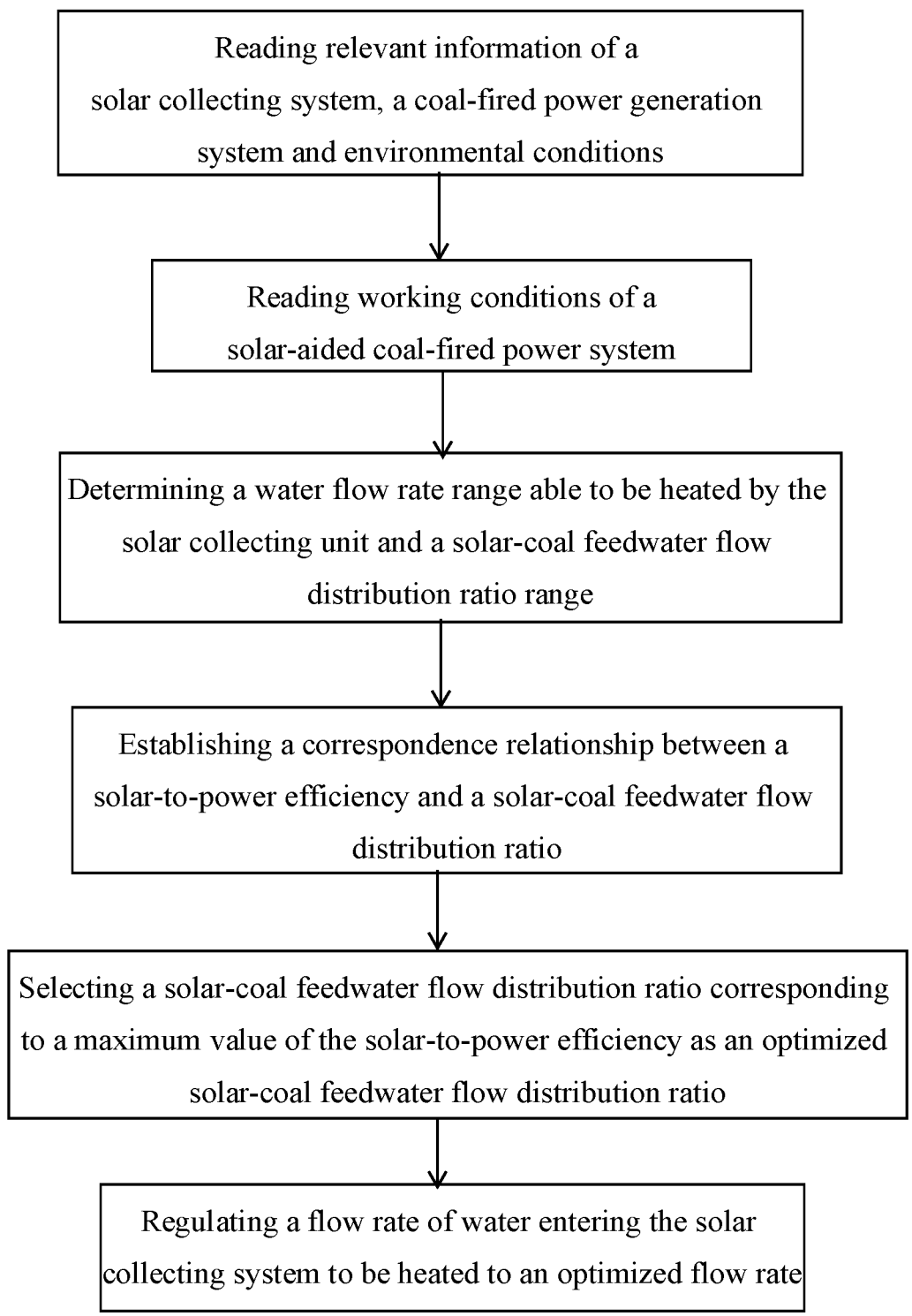
FIG. 1 is a flow chart of a control method for optimizing a solar-to-power efficiency of a solar-aided coal-fired power system under off-design working conditions according to a preferred embodiment of the present invention.

As shown in FIG. 1, according to the preferred embodiment of the present invention, a control method for optimizing a solar-to-power efficiency of a solar-aided coal-fired power system under off-design working conditions is provided, wherein: an operational control objective of the solar-aided coal-fired power system under the off-design working conditions is to optimize the solar-to-power efficiency; the solar-to-power efficiency means a conversion ratio of solar radiation energy received by the solar-aided coal-fired power system into electricity, namely a ratio of additional power generation of the solar-aided coal-fired power system to the solar radiation energy received by the solar-aided coal-fired power system when the solar-aided coal-fired power system has the same boiler heat absorption as a conventional coal-fired power generation system uncoupled with solar energy;

the solar-to-power efficiency is calculated through steps of: firstly, through equation (1), calculating a specific enthalpy of mixing water heated by a solar collecting system and high-pressure heaters; then, combined with an off-design working condition calculation method of a thermodynamic system, through equation (2), calculating a generation power $W_{SCPP}$ of the solar-aided coal-fired power system; next, assuming that the solar-aided coal-fired power system and the conventional coal-fired power generation system uncoupled with solar energy have the same boiler heat absorption, and calculating the solar-to-power efficiency $\eta_{SE}$ according to equation (3) and equation (4);

$$h_{w(i-1),in} = \alpha_{TCS} \times h_{s,out} + (1-\alpha_{TCS}) h_{wi,out} \tag{1}$$

in the equation (1), $h_{w(i-1),in}$ is the specific enthalpy of mixing water heated by the solar collecting system and the high-pressure heaters, i=1, 2, •••, n, in unit of kJ/kg; n is a total number of regenerative heaters of the solar-aided coal-fired power system, wherein the regenerative heaters are numbered 1 to n consecutively from high pressure to low pressure; $\alpha_{TCS}$ is a solar-coal feedwater flow distribution ratio; $h_{s,out}$ is a specific enthalpy of water heated by the solar collecting system, in unit of kJ/kg; and $h_{wi,out}$ is a specific enthalpy of water heated by the high-pressure heaters, in unit of kJ/kg;

$$W_{SCPP} = D_0 h_0 + D_{zr} h_{zr} - \sum_{i=1}^{n} D_i h_{wi,in} - D_c h_c - D_{sg1} h_{sg1} - D_{sg2} h_{sg2} \tag{2}$$

in the equation (2), $W_{SCPP}$ is the generation power of the solar-aided coal-fired power system, in unit of MW; $D_0$ is a flow rate of main steam of the solar-aided coal-fired power system, in unit of kg/s; $h_0$ is a specific enthalpy of main steam of the solar-aided coal-fired power system, in unit of kJ/kg; $D_{zr}$ is a flow rate of reheated steam of the solar-aided coal-fired power system, in unit of kg/s; $h_{zr}$ is a specific enthalpy of reheated steam of the solar-aided coal-fired power system, in unit of kJ/kg; $D_i$ is a flow rate of $i^{th}$-stage extraction steam of a steam turbine for coal-fired power generation in the solar-aided coal-fired power system, i=1, 2, •••, n, in unit of kg/s; $h_{wi,in}$ is a specific enthalpy of $i^{th}$-stage extraction steam of the steam turbine for coal-fired power generation in the solar-aided coal-fired power system, in unit of kJ/kg; $D_c$ is a flow rate of exhaust steam of the solar-aided coal-fired power system, in unit of kg/s; $h_c$ is a specific enthalpy of exhaust steam of the solar-aided coal-fired power system, in unit of kJ/kg; $D_{sg1}$ and $D_{sg2}$ are flow rates of front shaft seal steam and back shaft seal steam of the steam turbine for coal-fired power generation in the solar-aided coal-fired power system, in unit of kg/s; $h_{sg1}$ and $h_{sg2}$ are specific enthalpies of front shaft seal steam and back shaft seal steam of the steam turbine for coal-fired power generation in the solar-aided coal-fired power system, in unit of kJ/kg;

$$W_{add} = W_{SCPP} - W_{eq} \tag{3}$$

in the equation (3), $W_{add}$ is additional power of the solar-aided coal-fired power system under the same boiler heat absorption, in unit of MW; $W_{eq}$ is an equivalent generation power of the conventional coal-fired power generation system uncoupled with solar energy when having the same boiler heat absorption as the solar-aided coal-fired power system under the same power generation load requirement, in unit of MW;

$$\eta_{SE} = \frac{10^6 W_{add}}{DNI \cdot A_c} \tag{4}$$

in the equation (4), $\eta_{SE}$ is the solar-to-power efficiency of the solar-aided coal-fired power system; DNI is a solar direct normal irradiance, in unit of W/m$^2$; $A_c$ is a solar collecting area, in unit of m$^2$;

the control method for optimizing the solar-to-power efficiency of the solar-aided coal-fired power system under the off-design working conditions comprises steps of:

(1) reading relevant information of the solar collecting system in parallel with the high-pressure heaters, a coal-fired power generation system and environmental conditions in the solar-aided coal-fired power system;

(2) reading working conditions of the solar-aided coal-fired power system;

(3) according to a working temperature range of heat transfer oil of a solar collecting unit and a safely working range of devices of the solar collecting unit, determining a water flow rate range able to be heated by the solar collecting unit; then, according to a ratio of the water flow rate range to a feedwater flow rate of the coal-fired power generation system, determining a solar-coal feedwater flow distribution ratio range of the solar-aided coal-fired power system;

(4) in the solar-coal feedwater flow distribution ratio range calculated through the step (3), calculating a solar-to-power efficiency $\eta_{SE}$ of the solar-aided coal-fired power system under current solar irradiance conditions and power load conditions, and establishing a relationship between the solar-to-power efficiency and the solar-coal feedwater flow distribution ratio of the solar-aided coal-fired power system;

(5) selecting an optimized solar-coal feedwater flow distribution ratio, specifically comprising steps of: in the relationship between the solar-to-power efficiency and the solar-coal feedwater flow distribution ratio under required working conditions, which is established through the step (4), selecting a solar-coal feedwater flow distribution ratio corresponding to a maximum value of the solar-to-power efficiency as the optimized solar-coal feedwater flow distribution ratio; and (6) according to the optimized solar-coal feedwater flow distribution ratio obtained through the step (5), regulating a flow rate of water entering the solar collecting system to be heated to an optimized flow rate $D_{wTCS}^*$, wherein $D_{wTCS}^*$ is calculated through:

$$D_{wTCS}^* = \alpha_{TCS}^* \cdot D_w;$$

in the above equation, $D_{wTCS}^*$ is the optimized flow rate of water entering the solar collecting system to be heated, in unit of kg/s; $\alpha_{TCS}^*$ is the optimized solar-coal feedwater flow distribution ratio; and $D_w$ is a feedwater flow rate under current working conditions, in unit of kg/s;

when the working conditions of the solar-aided coal-fired power system change or the solar irradiance changes, the steps (1)-(6) are repeated to achieve the control objective again.

In the preferred embodiment, in the step (1), the read relevant information of the environmental conditions comprises a current solar irradiance and an environmental temperature; the read relevant information of the solar collecting system comprises relevant information of the solar collecting unit and relevant information of a heliostat field; the read relevant information of the coal-fired power generation system comprises main steam parameters, extraction steam parameters of the steam turbine for coal-fired power generation, and operation information of the high-pressure heaters and low-pressure heaters, which are required for calculation of the generation power.

In the preferred embodiment, a design solar irradiance is an average solar direct normal irradiance of a typical meteorological year at an operation location of the solar-aided coal-fired power system; in the step (5), the solar-coal feedwater flow distribution ratio corresponding to the maximum value of the solar-to-power efficiency is: under 80%-100% power load, the solar-coal feedwater flow distribution ratio is controlled to operate at a lower limiting value; under 60%-80% power load, when the solar direct normal irradiance is not less than 85%-105% design solar irradiance, the solar-coal feedwater flow distribution ratio is controlled to operate at the lower limiting value, while when the solar direct normal irradiance is less than 85%-105% design solar irradiance, the solar-coal feedwater flow distribution ratio is controlled to operate between 0.2 and 0.3; under 40%-60% power load, when the solar direct normal irradiance is not less than 94%-110% design solar irradiance, the solar-coal feedwater flow distribution ratio is controlled to operate between 0.4 and 0.45, while when the solar direct normal irradiance is less than 94%-110% design solar irradiance, the solar-coal feedwater flow distribution ratio is controlled to operate between 0.25 and 0.3.

Figure 2:
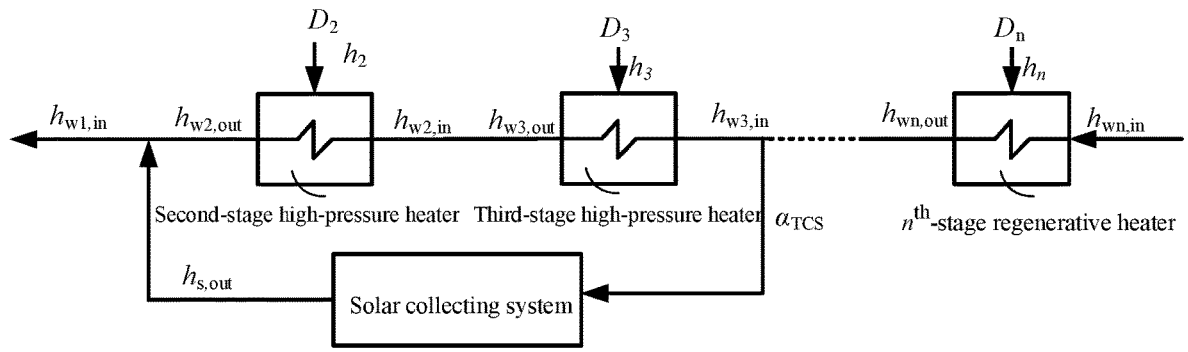
FIG. 2 is a connection sketch view of regenerative heaters of an implementation system for the control method according to the preferred embodiment of the present invention.

Referring to FIG. 2, in the preferred embodiment, the solar collecting system of the solar-aided coal-fired power system is connected in parallel with a second-stage high-pressure heater and a third-stage high-pressure heater.

In the preferred embodiment, Table 1 lists major parameters and major environmental information of the solar-aided coal-fired power system.

TABLE 1

Major parameters and major environmental information of solar-aided coal-fired power system

| Parameter | Value | Unit |
|---|---|---|
| Rated power of coal-fired power generation system | 600 | MW |
| Main steam flow rate | 469.81 | kg/s |
| Main steam temperature | 566.0 | ° C. |
| Main steam pressure | 24.2000 | MPa |
| Reheated steam flow rate | 387.52 | kg/s |
| Reheated steam temperature | 566.0 | ° C. |
| Reheated steam pressure | 3.6110 | MPa |
| Outlet temperature after heating heat transfer oil | 350.0 | ° C. |
| Solar collecting area | 134138 | m² |
| Design solar irradiance | 638 | W/m² |
| Environmental temperature | 20 | ° C. |

Figure 3:
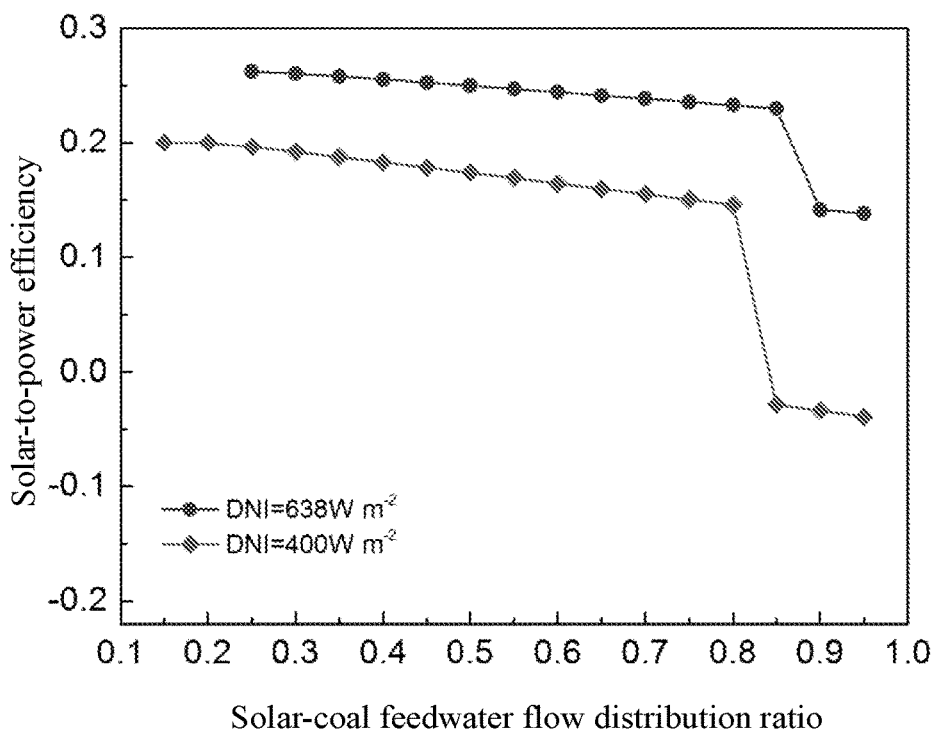
FIG. 3 is a sketch view of a correspondence relationship between the solar-to-power efficiency and a solar-coal feedwater flow distribution ratio under a condition of 100% THA (Turbine Heat Acceptance) according to the preferred embodiment of the present invention.
Figure 4:
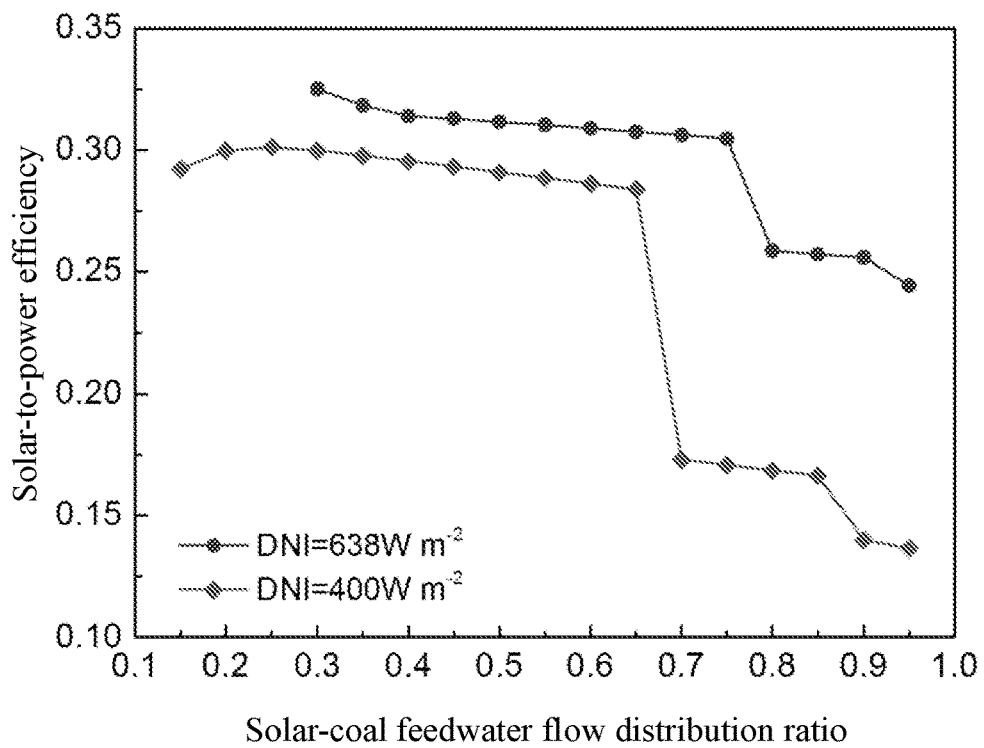
FIG. 4 is a sketch view of a correspondence relationship between the solar-to-power efficiency and the solar-coal feedwater flow distribution ratio under a condition of 75% THA according to the preferred embodiment of the present invention.
Figure 5:
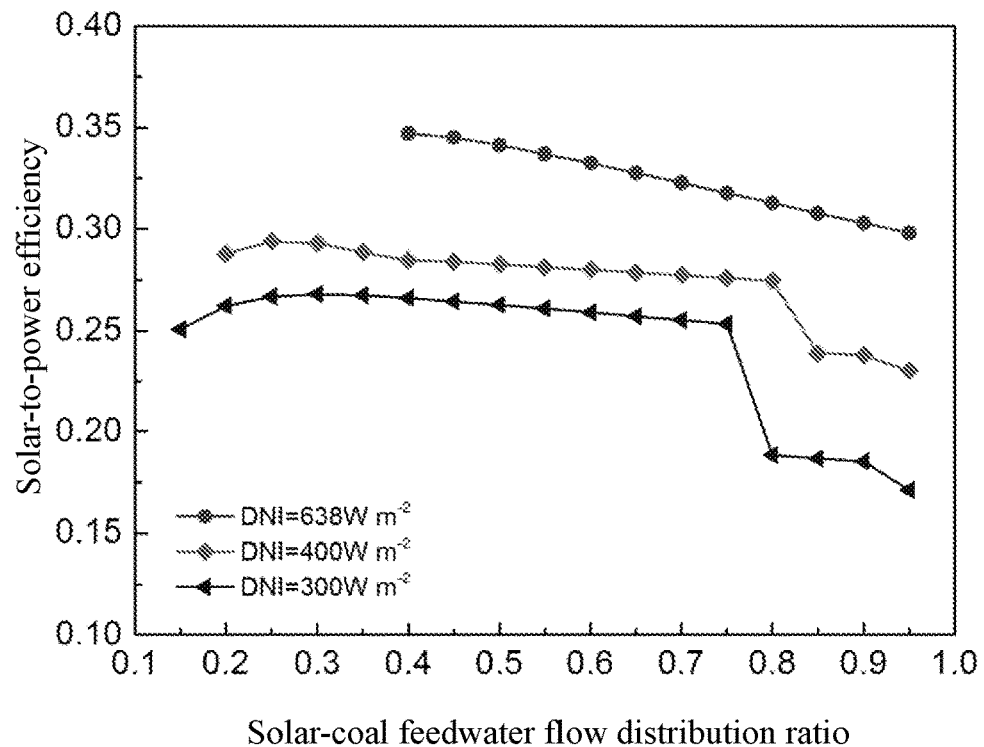
FIG. 5 is a sketch view of a correspondence relationship between the solar-to-power efficiency and the solar-coal feedwater flow distribution ratio under a condition of 50% THA according to the preferred embodiment of the present invention.

The research shows that: the correspondence relationship between the solar-to-power efficiency and the solar-coal feedwater flow distribution ratio under different working conditions is different and related to the solar irradiance. When the solar-aided coal-fired power system operates under the 80%-100% power load, with an example of 100% power load shown in FIG. 3, the correspondence relationship between the solar-to-power efficiency and the solar-coal feedwater flow distribution ratio is monotonically decreasing. Thus, the solar-coal feedwater flow distribution ratio is controlled to operate at the lower limiting value. When the solar-aided coal-fired power system operates under the 60%-80% power load, with an example of 75% power load shown in FIG. 4, the correspondence relationship between the solar-to-power efficiency and the solar-coal feedwater flow distribution ratio is decreasing when the solar direct normal irradiance is not less than 85%-105% design solar irradiance; the correspondence relationship between the solar-to-power efficiency and the solar-coal feedwater flow distribution ratio is firstly increasing and then decreasing when the solar direct normal irradiance is less than 85%-105% design solar irradiance; and the maximum value occurs in a range of 0.2 to 0.3. Thus, when the solar direct normal irradiance is not less than 85%-105% design solar irradiance, the solar-coal feedwater flow distribution ratio is controlled to operate at the lower limiting value; when the solar direct normal irradiance is less than 85%-105% design solar irradiance, the solar-coal feedwater flow distribution ratio is controlled to operate between 0.2 and 0.3. When the solar-aided coal-fired power system operates under the 40%-60% power load, with an example of 50% power load shown in FIG. 5, the correspondence relationship between the solar-to-power efficiency and the solar-coal feedwater flow distribution ratio is decreasing when the solar direct normal irradiance is not less than 94%-110% design solar irradiance; the correspondence relationship between the solar-to-power efficiency and the solar-coal feedwater flow distribution ratio is firstly increasing and then decreasing when the solar direct normal irradiance is less than 94%-110% design solar irradiance. Thus, when the solar direct normal irradiance is not less than 94%-110% design solar irradiance, the solar-coal feedwater flow distribution ratio is controlled to operate between 0.4 and 0.45; when the solar direct normal irradiance is less than 94%-110% design solar irradiance, the solar-coal feedwater flow distribution ratio is controlled to operate between 0.25 and 0.3.

Through regulating the solar-coal feedwater flow distribution ratio and controlling the flow rate of feedwater entering the solar collecting system to be heated, the present invention ensures the solar-to-power efficiency to reach a maximum value, which provides clear guidance for optimization of the utilization rate of solar energy under the off-design working conditions, improves the energy utilization rate of the solar-aided coal-fired power system, and is simple to operate and easily implemented.

What is claimed is:

1. A control method for optimizing a solar-to-power efficiency of a solar-aided coal-fired power system under off-design working conditions, wherein:

an operational control objective of the solar-aided coal-fired power system under the off-design working conditions is to optimize the solar-to-power efficiency; the solar-to-power efficiency means a conversion ratio of solar radiation energy received by the solar-aided coal-fired power system into electricity, namely a ratio of additional power generation of the solar-aided coal-fired power system to the solar radiation energy received by the solar-aided coal-fired power system when the solar-aided coal-fired power system has the same boiler heat absorption as a conventional coal-fired power generation system uncoupled with solar energy;

the solar-to-power efficiency is calculated through steps of: firstly, through equation (1), calculating a specific enthalpy of mixing water heated by a solar collecting system and high-pressure heaters; then, combined with an off-design working condition calculation method of a thermodynamic system, through equation (2), calculating a generation power $W_{SCPP}$ of the solar-aided coal-fired power system; next, assuming that the solar-aided coal-fired power system and the conventional coal-fired power generation system uncoupled with solar energy have the same boiler heat absorption, and calculating the solar-to-power efficiency $\eta_{SE}$ according to equation (3) and equation (4);

$$h_{w(i-1),in} = \alpha_{TCS} \times h_{s,out} + (1-\alpha_{TCS}) h_{wi,out} \quad (1)$$

in the equation (1), $h_{w(i-1),in}$ is the specific enthalpy of mixing water heated by the solar collecting system and the high-pressure heaters, i=1, 2, •••, n, in unit of kJ/kg; n is a total number of regenerative heaters of the solar-aided coal-fired power system, wherein the regenerative heaters are numbered 1 to n consecutively from high pressure to low pressure; $\alpha_{TCS}$ is a solar-coal feedwater flow distribution ratio; $h_{s,out}$ is a specific enthalpy of water heated by the solar collecting system, in unit of kJ/kg; and $h_{wi,out}$ is a specific enthalpy of water heated by the high-pressure heaters, in unit of kJ/kg;

$$W_{SCPP} = D_0 h_0 + D_{zr} h_{zr} - \sum_{i=1}^{n} D_i h_{wi,in} - D_c h_c - D_{sg1} h_{sg1} - D_{sg2} h_{sg2} \quad (2)$$

in the equation (2), $W_{SCPP}$ is the generation power of the solar-aided coal-fired power system, in unit of MW; $D_0$ is a flow rate of main steam of the solar-aided coal-fired power system, in unit of kg/s; $h_0$ is a specific enthalpy of main steam of the solar-aided coal-fired power system, in unit of kJ/kg; $D_{zr}$ is a flow rate of reheated steam of the solar-aided coal-fired power system, in unit of kg/s; $h_{zr}$ is a specific enthalpy of reheated steam of the solar-aided coal-fired power system, in unit of kJ/kg; $D_i$ is a flow rate of $i^{th}$-stage extraction steam of a steam turbine for coal-fired power generation in the solar-aided coal-fired power system, i=1, 2, •••, n, in unit of kg/s; $h_{wi,in}$ is a specific enthalpy of $i^{th}$-stage extraction steam of the steam turbine for coal-fired power generation in the solar-aided coal-fired power system, in unit of kJ/kg; $D_c$ is a flow rate of exhaust steam of the solar-aided coal-fired power system, in unit of kg/s; $h_c$ is a specific enthalpy of exhaust steam of the solar-aided coal-fired power system, in unit of kJ/kg; $D_{sg1}$ and $D_{sg2}$ are flow rates of front shaft seal steam and back shaft seal steam of the steam turbine for coal-fired power generation in the solar-aided coal-fired power system, in unit of kg/s; $h_{sg1}$ and $h_{sg2}$ are specific enthalpies of front shaft seal steam and back shaft seal steam of the steam turbine for coal-fired power generation in the solar-aided coal-fired power system, in unit of kJ/kg;

$$W_{add} = W_{SCPP} - W_{eq} \quad (3)$$

in the equation (3), $W_{add}$ is additional power of the solar-aided coal-fired power system under the same boiler heat absorption, in unit of MW; $W_{eq}$ is an equivalent generation power of the conventional coal-fired power generation system uncoupled with solar energy when having the same boiler heat absorption as the solar-aided coal-fired power system under the same power generation load requirement, in unit of MW;

$$\eta_{SE} = \frac{10^6 W_{add}}{DNI \cdot A_c} \quad (4)$$

in the equation (4), $\eta_{SE}$ is the solar-to-power efficiency of the solar-aided coal-fired power system; DNI is a solar direct normal irradiance, in unit of W/m$^2$; $A_c$ is a solar collecting area, in unit of m$^2$;

the control method for optimizing the solar-to-power efficiency of the solar-aided coal-fired power system under the off-design working conditions comprises steps of:

(1) reading relevant information of the solar collecting system in parallel with the high-pressure heaters, a coal-fired power generation system and environmental conditions in the solar-aided coal-fired power system;

(2) reading working conditions of the solar-aided coal-fired power system;

(3) according to a working temperature range of heat transfer oil of a solar collecting unit and a safely working range of devices of the solar collecting unit, determining a water flow rate range able to be heated by the solar collecting unit; then, according to a ratio of the water flow rate range to a feedwater flow rate of the coal-fired power generation system, determining a solar-coal feedwater flow distribution ratio range of the solar-aided coal-fired power system;

(4) in the solar-coal feedwater flow distribution ratio range calculated through the step (3), calculating a solar-to-power efficiency $\eta_{SE}$ of the solar-aided coal-fired power system under current solar irradiance conditions and power load conditions, and establishing a relationship between the solar-to-power efficiency and the solar-coal feedwater flow distribution ratio of the solar-aided coal-fired power system;

(5) selecting an optimized solar-coal feedwater flow distribution ratio, specifically comprising steps of: in the relationship between the solar-to-power efficiency and the solar-coal feedwater flow distribution ratio under required working conditions, which is established through the step (4), selecting a solar-coal feedwater flow distribution ratio corresponding to a maximum value of the solar-to-power efficiency as the optimized solar-coal feedwater flow distribution ratio; and (6) according to the optimized solar-coal feedwater flow distribution ratio obtained through the step (5), regulating a flow rate of water entering the solar collecting system to be heated to an optimized flow rate $D_{wTCS}^*$, wherein $D_{wTCS}^*$ is calculated through:

$$D_{wTCS}^* = \alpha_{TCS}^* \cdot D_w;$$

in the above equation, $D_{wTCS}^*$ is the optimized flow rate of water entering the solar collecting system to be heated, in unit of kg/s; $\alpha_{TCS}^*$ is the optimized solar-coal feedwater flow distribution ratio; and $D_w$ is a feedwater flow rate under current working conditions, in unit of kg/s;

when the working conditions of the solar-aided coal-fired power system change or the solar irradiance changes, the steps (1)-(6) are repeated to achieve the control objective again.

2. The control method, as recited in claim 1, wherein: in the step (1), the read relevant information of the environmental conditions comprises a current solar irradiance and an environmental temperature; the read relevant information of the solar collecting system comprises relevant information of the solar collecting unit and relevant information of a heliostat field; the read relevant information of the coal-fired power generation system comprises main steam parameters, extraction steam parameters of the steam turbine for coal-fired power generation, and operation information of the high-pressure heaters and low-pressure heaters, which are required for calculation of the generation power.

3. The control method, as recited in claim 1, wherein: a design solar irradiance is an average solar direct normal irradiance of a typical meteorological year at an operation location of the solar-aided coal-fired power system; in the step (5), the solar-coal feedwater flow distribution ratio corresponding to the maximum value of the solar-to-power efficiency is: under 80%-100% power load, the solar-coal feedwater flow distribution ratio is controlled to operate at a lower limiting value; under 60%-80% power load, when the solar direct normal irradiance is not less than 85%-105% design solar irradiance, the solar-coal feedwater flow distribution ratio is controlled to operate at the lower limiting value, while when the solar direct normal irradiance is less than 85%-105% design solar irradiance, the solar-coal feedwater flow distribution ratio is controlled to operate between 0.2 and 0.3; under 40%-60% power load, when the solar direct normal irradiance is not less than 94%-110% design solar irradiance, the solar-coal feedwater flow distribution ratio is controlled to operate between 0.4 and 0.45, while when the solar direct normal irradiance is less than 94%-110% design solar irradiance, the solar-coal feedwater flow distribution ratio is controlled to operate between 0.25 and 0.3.

4. The control method, as recited in claim 1, wherein: the solar collecting system of the solar-aided coal-fired power system is connected in parallel with a second-stage high-pressure heater and a third-stage high-pressure heater.

* * * * *